United States Patent
Miyazawa et al.

(10) Patent No.: US 6,590,761 B2
(45) Date of Patent: Jul. 8, 2003

(54) CAPACITOR

(75) Inventors: Hisao Miyazawa, Shiga (JP); Tsuyoshi Yoshino, Kameoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/163,532

(22) Filed: Jun. 7, 2002

(65) Prior Publication Data

US 2002/0186523 A1 Dec. 12, 2002

(30) Foreign Application Priority Data

Jun. 8, 2001 (JP) .................................. 2001-173669

(51) Int. Cl.$^7$ .............................. H01G 4/00; H01G 2/10
(52) U.S. Cl. ................. 361/301.3; 361/306.1; 361/517; 361/535
(58) Field of Search ................. 361/301.3, 309, 361/517, 518, 519, 520, 533, 535, 536, 537, 538, 541, 306.1

(56) References Cited

U.S. PATENT DOCUMENTS 5,412,532 A * 5/1995 Nishimori et al. ....... 361/306.1
6,310,756 B1 * 10/2001 Miura et al. ............. 361/301.3

FOREIGN PATENT DOCUMENTS

| JP | 3-74834 | * | 3/1991 |
| JP | 110479 | * | 4/2002 |

* cited by examiner

Primary Examiner—Anthony Dinkins
(74) Attorney, Agent, or Firm—Greenblum & Bernstein, P.L.C.

(57) ABSTRACT

A capacitor includes a capacitor element having leads accommodated along with electrolyte solution in a metallic case, and a sealing plate that seals the opening of the metallic case. In the capacitor, a center axis of a threaded portion provided in a terminal block on the sealing plate is constituted to be parallel to a planar portion of the sealing plate. Hence, the center axis of the threaded portion is vertical to a circuit board when mounting the capacitor onto the circuit board. Thereby, a series of operation from the insertion to the tightening of the mounting screw is done very easily.

9 Claims, 10 Drawing Sheets

Prior Art

CAPACITOR

The present disclosure relates to subject matter contained in priority Japanese Patent Application No. 2001-173669, filed on Jun. 8, 2001, the contents of which is herein expressly incorporated by reference in its entirety.

BACKGROUND OF THE INVENTION

1. Field of the Invention

The present invention relates to a capacitor that is used in various types of electronic equipment, and particularly relates to a capacitor provided with a terminal block for outside connection.

2. Description of Related Art

A conventional capacitor of this kind will be described, with references to the drawings.

Figure 9:
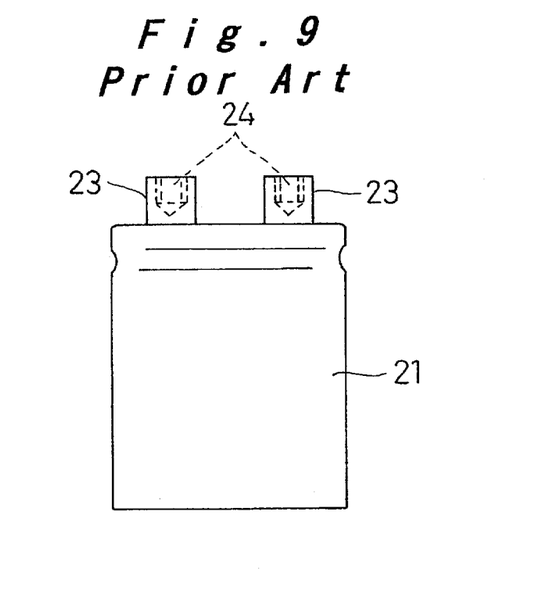
FIG. 9 is a front view showing the constitution of a conventional capacitor.
Figure 10A:
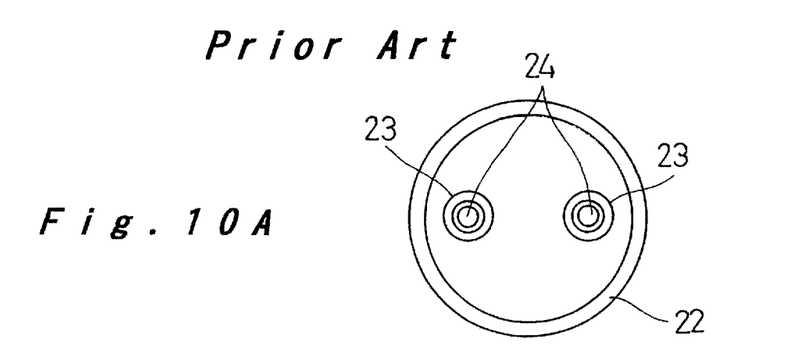
FIG. 10A is a plan view showing a sealing plate of the conventional capacitor.
Figure 10B:
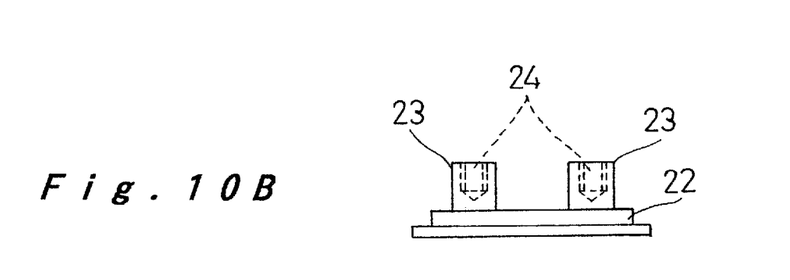
FIG. 10B is a front view of the same.
Figure 11:
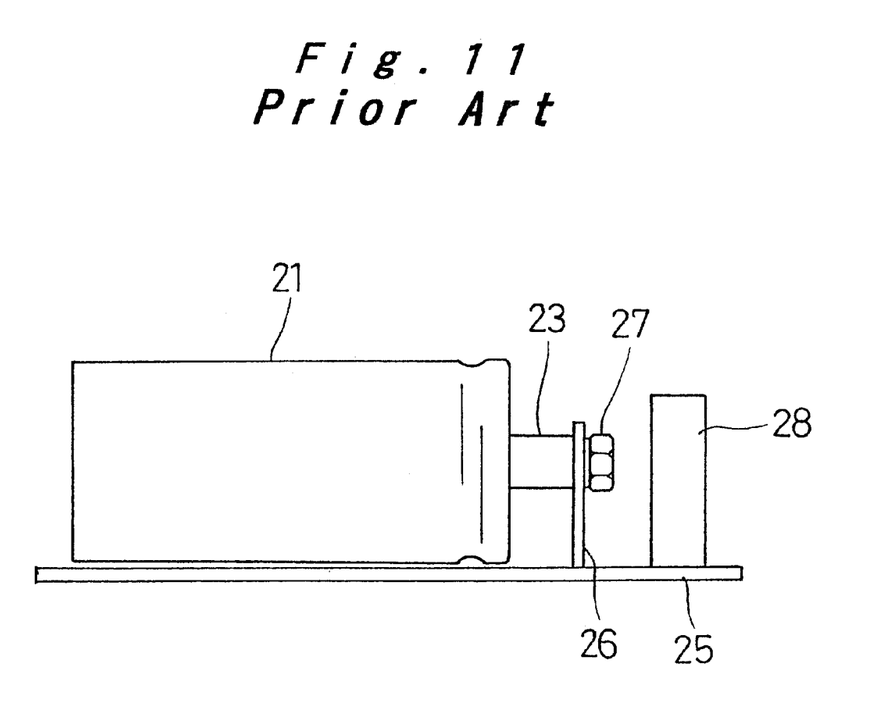
FIG. 11 is a front view showing a state with the conventional capacitor mounted onto a circuit board.

FIG. 9 is a front view showing a conventional capacitor. FIG. 10A is a plan view and FIG. 10B is a front view, showing a sealing plate of the conventional capacitor. FIG. 11 is a front view showing a state with the capacitor mounted onto a circuit board.

In FIG. 9 through FIG. 11, a metallic case 21 of cylindrical form with bottom accommodates a capacitor element (not shown) along with electrolyte solution. A sealing plate 22 seals the opening of the metallic case 21. A pair of terminal blocks 23 are provided integrally with the sealing plate 22 by insert molding, and a threaded portion 24 is provided in the terminal block 23. Reference numeral 25 denotes a circuit board, and a mounting plate 26 is provided on the circuit board 25, for mounting the capacitor. Reference numeral 27 denotes a mounting screw for screwing-on and fastening the capacitor, with the mounting plate 26 interposed therebetween. Reference numeral 28 denotes other electronic components mounted onto the circuit board 25.

The conventional capacitor with such a constitution is fastened by screwing together the mounting screw 27 onto the threaded portion 24 of the terminal block 23, with the mounting plate 26 interposed therebetween, and mounted onto the circuit board 25 along with the other electronic components 28.

The reason why the capacitor is mounted onto the circuit board 25 sideways, is that this is a common practice to suppress height and pursue a low-profile shape, and has become a generalized designing method in recent times.

However, in the above-mentioned conventional capacitor, the threaded portion 24 of the terminal block 23 was constituted to have its central axis to be in the vertical direction relative to the sealing plate 22. Hence, it was difficult to insert the mounting screw 27 into the threaded portion 24, and even more difficult to tighten the inserted mounting screw 27, when the capacitor is mounted onto the circuit board 25 adjacent to another electronic component 28, as shown in FIG. 11. It was not possible to use a mounting screw 27 provided with crossheads, which could be tightened easily using a Phillips-head screwdriver. It could only use a bolt with a hexagonal head, which was tightened by a wrench. Hence, there was a problem in which the types of components that could be used were limited, and also a problem of workability being bad.

SUMMARY OF THE INVENTION

In light of the above-mentioned conventional problems, an object of the present invention is to provide a capacitor which is easily mounted on a circuit board.

A capacitor of the present invention has a capacitor element accommodated along with electrolyte solution inside a metallic case. The capacitor element is provided with leads of positive and negative electrodes. The capacitor also includes a sealing plate for sealing the opening of the metallic case. The sealing plate is provided with a pair of terminal blocks that has a threaded portion for outside connection, and a connecting portion, onto which the lead of the capacitor element is connected. The capacitor has a center axis of the threaded portion made to be parallel to a planar portion of the sealing plate. With this constitution, there are no obstacles near the threaded portion, because the center axis of the threaded portion is orthogonal to the circuit board when mounting this capacitor onto the circuit board sideways. Accordingly, there is an action and effect that it becomes very easy to conduct the series of operation, from the insertion to the tightening of the mounting screw.

In the above-described capacitor, it is preferred that the center axes of the threaded portions provided in the pair of terminal blocks be made to intersect orthogonal to a line mutually connecting both of the central portions of the terminal blocks. It is also preferred that both of these center axes be made to be parallel to each other.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS (First Embodiment)

Figure 1A:
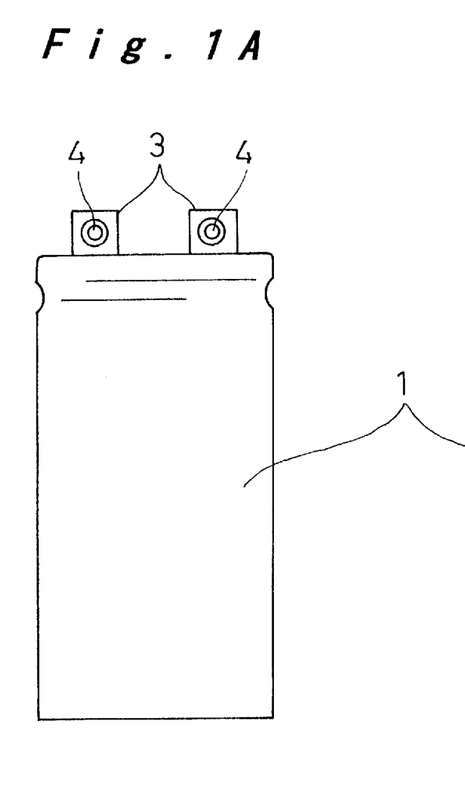
FIG. 1A is a front view showing the constitution of a capacitor according to a first embodiment of the present invention.
Figure 1B:
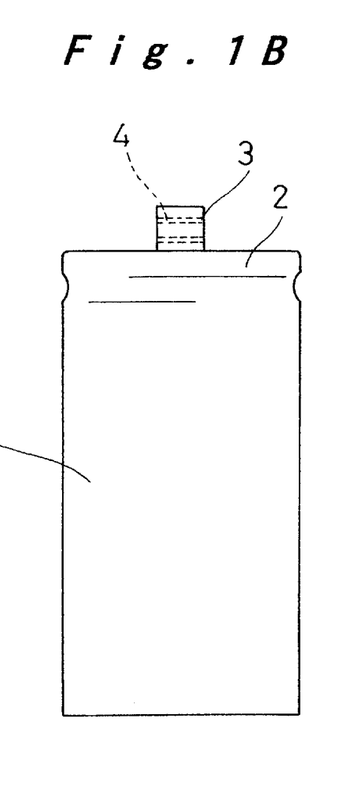
FIG. 1B is a side view of the same.
Figure 2A:
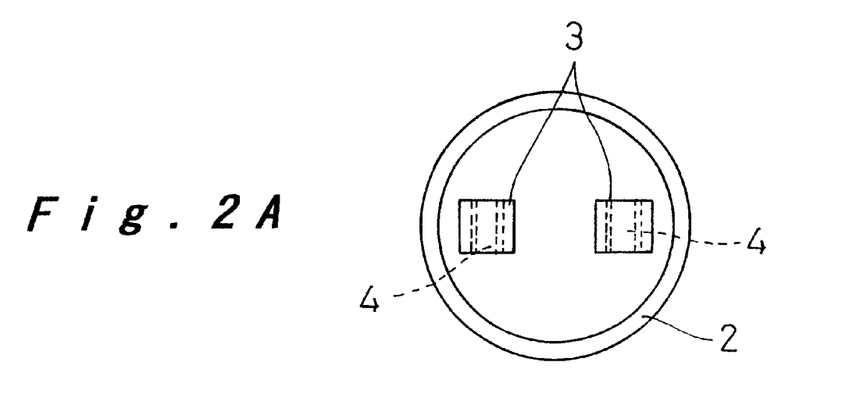
FIG. 2A is a plan view showing a sealing plate of the capacitor.
Figure 2B:
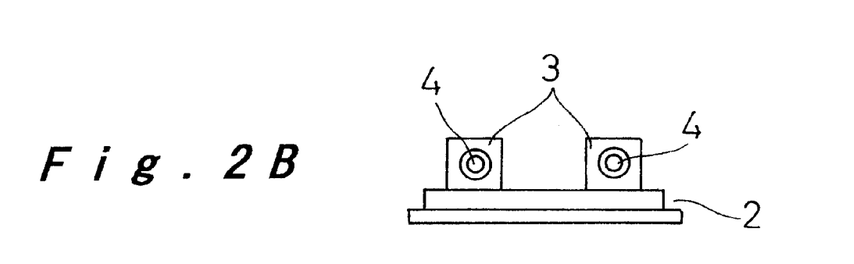
FIG. 2B is a front view of the same.
Figure 3:
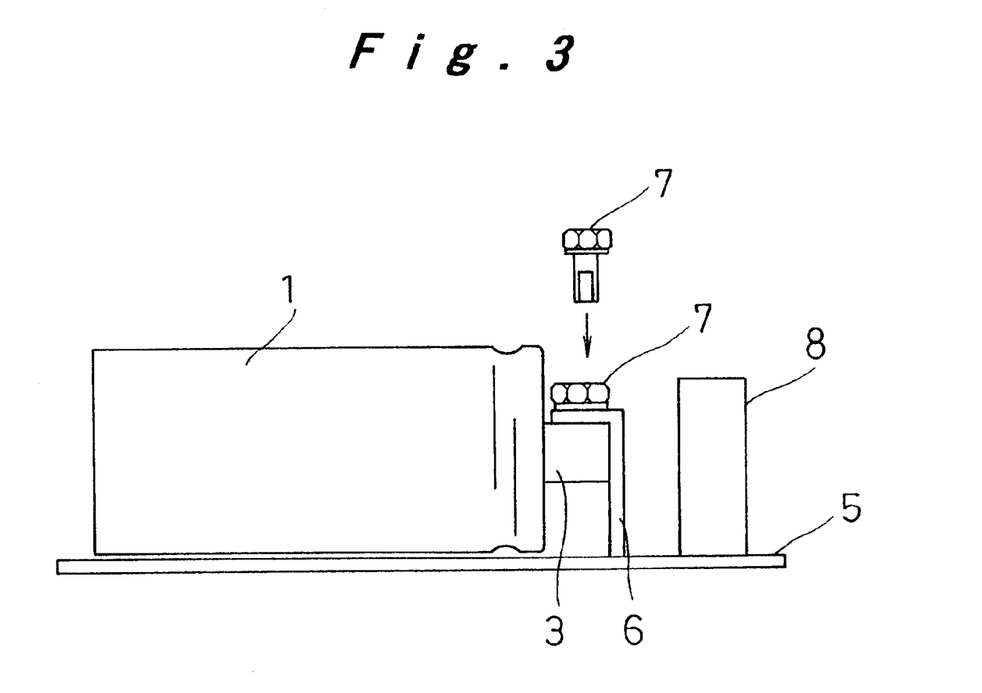
FIG. 3 is a front view showing a state with the capacitor mounted onto a circuit board.

FIG. 1A is a front view and FIG. 1B is a side view, showing the constitution of a capacitor according to a first embodiment of the present invention. FIG. 2A is a plan view and FIG. 2B is a front view, showing a sealing plate of the capacitor. FIG. 3 is a front view showing a state with the capacitor mounted onto a circuit board.

In FIG. 1A through FIG. 3, a metallic case 1 of cylindrical form with bottom accommodates a capacitor element (not shown) along with electrolyte solution. A sealing plate 2 seals the opening of the metallic case 1. A pair of terminal blocks 3 are provided integrally with the sealing plate 2 by insert molding, and a threaded portion 4 is provided in the terminal block 3. Reference numeral 5 denotes a circuit board, and a mounting plate 6 of inverted "L" letter shape is provided on the circuit board 5, for mounting the capacitor. Reference numeral 7 denotes a mounting screw for screwing on and fastening the capacitor, with the mounting plate 6 interposed therebetween. Reference numeral 8 denotes other electronic components mounted onto the circuit board 5.

The capacitor of the first embodiment with such a constitution is fastened by screwing together the mounting screw 7 onto the threaded portion 4 of the terminal block 3 provided on the sealing plate 2, with the mounting plate 6 interposed therebetween, and mounted onto the circuit board 5 along with the other electronic components 8, as shown in FIG. 3.

Since the terminal blocks 3 are made integral with the sealing plate 2, and the center axes of the threaded portions 4 provided in the terminal blocks 3 are made to be parallel to the planar portion of the sealing plate 2, the capacitor is mounted onto the circuit board 5 very easily.

That is to say, the center axes of the threaded portions 4 are orthogonal to the circuit board 5 when arranging the capacitor 1 sideways on the circuit board 5, and there are no obstacles near the threaded portions 4 when screwing on the capacitor 1 with the mounting plates 6 interposed therebetween, as shown in FIG. 3. It becomes easy to insert the mounting screws 7 into the threaded portions 4, and it also becomes easy to tighten the mounting screws 7. Thus, a screw type with crossheads can be used for the mounting screws, which is easily tightened by a Phillips-head screwdriver. Substantial improvement in workability, and improvement in reliability are achieved at the same time, when using air screwdrivers and electric screwdrivers to tighten the mounting screws 7.

By making the sectional shape of the terminal blocks 3 circular, square, or circular with a straight portion on one part thereof (not shown), the terminal blocks 3 are positioned in a molding die with reliability, when unifying them with the sealing plate 2 with insert molding. As a result, the terminal blocks 3 are unified to the sealing plate 2 without having the center axis of each of the threaded portions 4 deviating its location, and precise sealing plates are manufactured with stability.

In the embodiment, the threaded portion 4 has a construction of piercing through the terminal block 3. This makes it possible not only to increase the fixing strength of the screwing-on by increasing the absolute surface area of the threaded portion 4, but also to mount the capacitor in a state inverted 180 degrees. This further increases the degree of freedom in mounting. However, the effects of the invention is sufficiently achieved even in a construction with the threaded portion 4 piercing only partway, and not all the way through the terminal block 3.

(Second Embodiment)

The same reference numeral has been given and a detailed description has been omitted for members that are the same with the first embodiment, and only the portions that are different from the first embodiment are described in detail hereinafter, with references to the drawings.

Figure 4A:
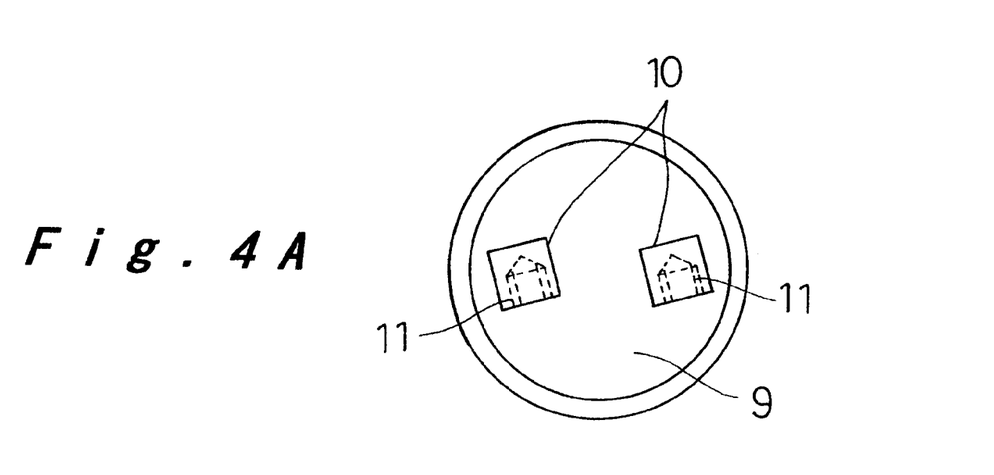
FIG. 4A is a plan view showing the constitution of a capacitor according to a second embodiment of the invention.
Figure 4B:
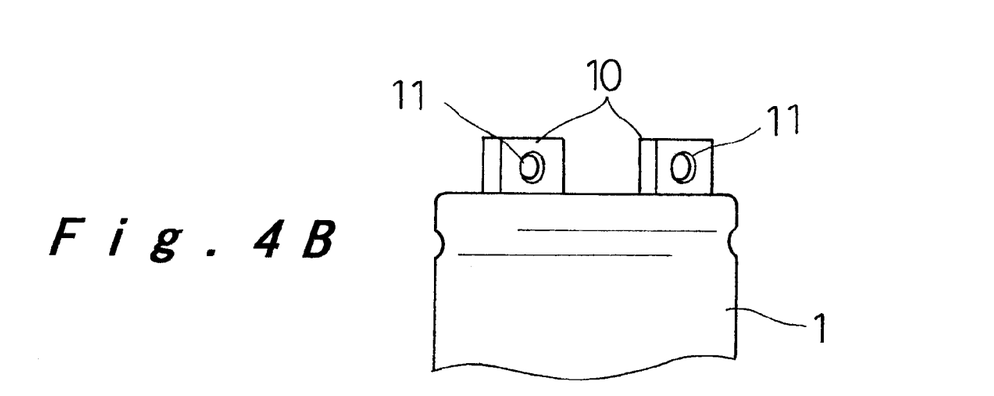
FIG. 4B is a front view of the principal part of the same.

FIG. 4A is a plan view, and FIG. 4B is a front view of the principal part, both showing the constitution of a capacitor according to a second embodiment. In these figures, reference numeral 9 denotes a sealing plate, and there is a pair of terminal blocks 10 provided with threaded portions 11 unified to the sealing plate 9 by insert molding. The pair of terminal blocks 10 has a constitution of being arranged and installed such that the center axes of the threaded portions 11 intersect at an angle not orthogonal to the line mutually connecting both of the central portions of the terminal blocks 10.

By constituting in this way, the mounting plates (not shown) or the connecting terminals (not shown) do not come into contact with each other, even when the mounting plates and the connecting terminals are connected to the pair of terminal blocks 10, and the connecting lines are drawn out in the same direction. Thereby, a remarkable effect in which high-density mounting becomes possible is achieved.

(Third Embodiment)

The same reference numeral has been given and a detailed description has been omitted for members that are the same with the first embodiment, and only the portions that are different from the first embodiment are described in detail hereinafter, with references to the drawings.

Figure 5A:
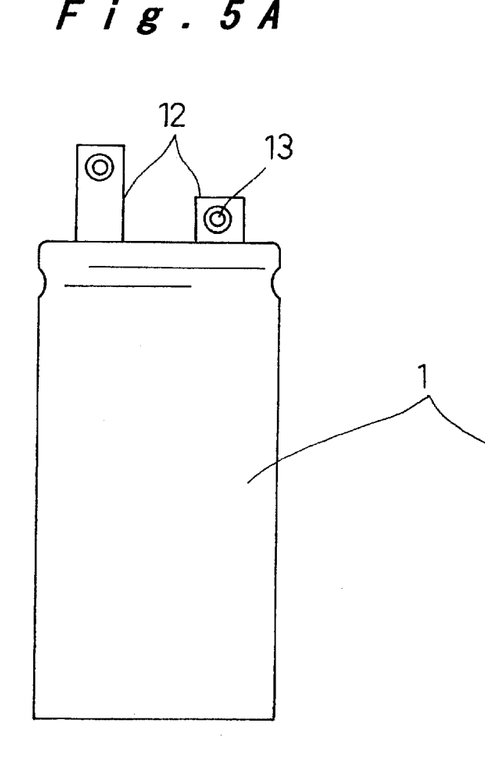
FIG. 5A is a front view showing the constitution of a capacitor according to a third embodiment of the invention.
Figure 5B:
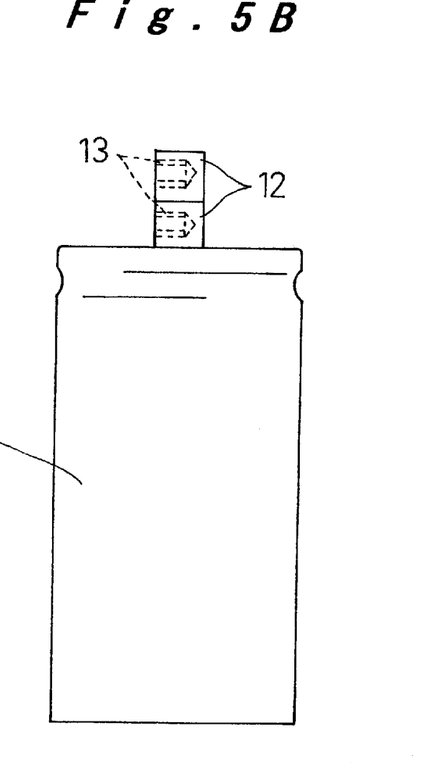
FIG. 5B is a side view of the same.

FIG. 5A is a front view and FIG. 5B is a side view, showing the constitution of a capacitor according to a third embodiment. In these figures, reference numeral 12 denotes a pair of terminal blocks that are provided integrally with the sealing plate (not shown) by insert molding, and reference numeral 13 denotes a threaded portion provided in each of the terminal blocks 12. The threaded portions 13 are constituted such that the distances from the surface of the sealing plate to the center axes of both of the threaded portions 13 are different.

By constituting in this way, mounting plates (not shown) and connecting terminals (not shown) do not come into contact with each other, even when the mounting plates and the connecting terminals are connected to the pair of terminal blocks 12, and the connecting lines are drawn out in the same direction. Therefore, a remarkable effect in which high-density mounting becomes possible is achieved.

(Fourth Embodiment)

The same reference numeral has been given and a detailed description has been omitted for members that are the same with the first embodiment, and only the portions that are different from the first embodiment are described in detail hereinafter, with references to the drawings.

Figure 6A:
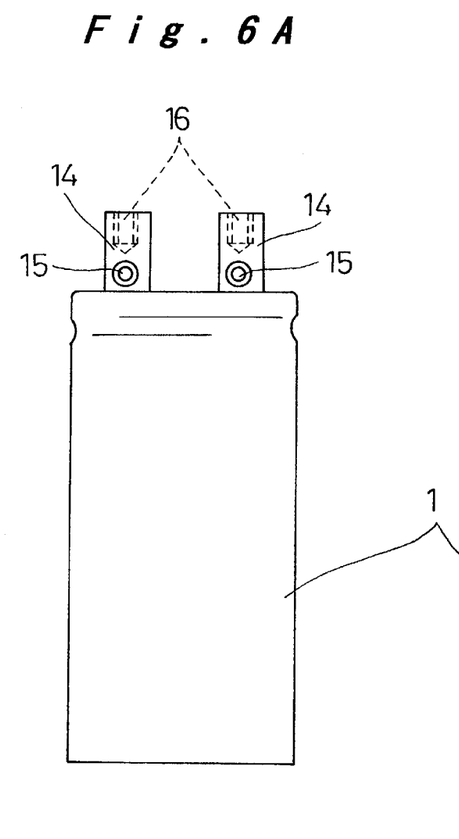
FIG. 6A is a front view showing the constitution of a capacitor according to a fourth embodiment of the invention.
Figure 6B:
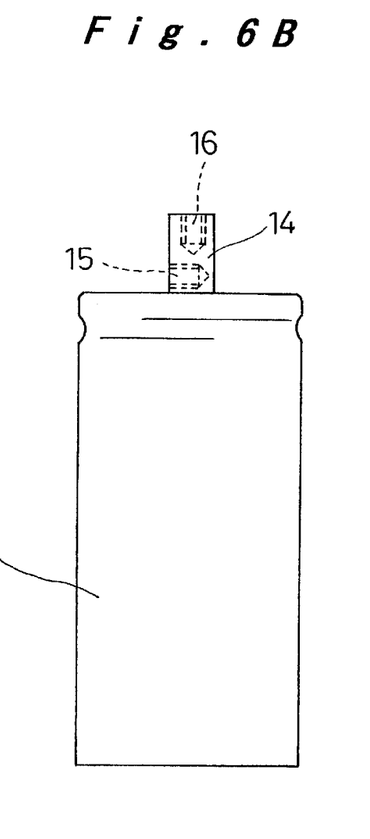
FIG. 6B is a side view of the same.

FIG. 6A is a front view and FIG. 6B is a side view, showing the constitution of a capacitor according to a fourth embodiment. In these figures, reference numeral 14 denotes a pair of terminal blocks that are provided integrally with the sealing plate (not shown) by insert molding. Reference numeral 15 denotes a first threaded portion, and reference numeral 16 denotes a second threaded portion provided in the terminal blocks 14.

The first threaded portion 15 has its center axis made to be parallel to the planar portion of the sealing plate, and the second threaded portion 16 has its center axis made to be vertical to the planar portion of the sealing plate. By constituting in this way, it also becomes possible to utilize the second threaded portion 16, when there is room around the space on the circuit board where the capacitor is mounted. Thus, the degree of freedom in mounting is increased.

(Fifth Embodiment)

The same reference numeral has been given and a detailed description has been omitted for members that are the same with the first embodiment, and only the portions that are different from the first embodiment are described in detail hereinafter, with references to the drawings.

Figure 7A:
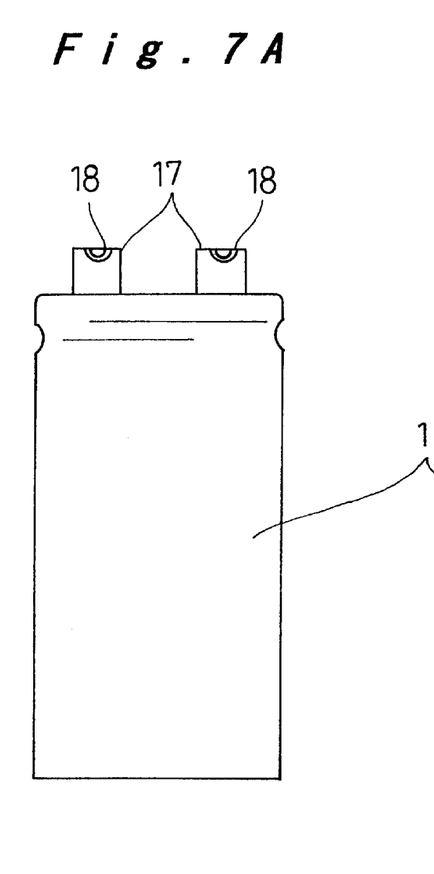
FIG. 7A is a front view showing the constitution of a capacitor according to a fifth embodiment of the invention.
Figure 7B:
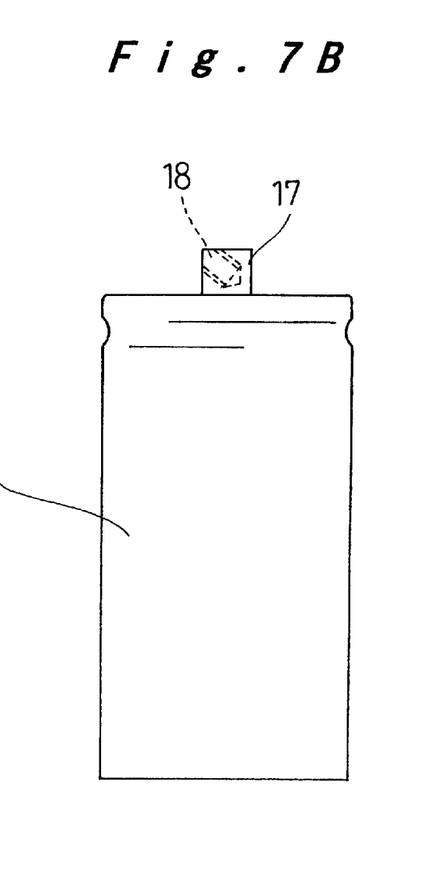
FIG. 7B is a side view of the same.

FIG. 7A is a front view and FIG. 7B is a side view, showing the constitution of a capacitor according to a fifth embodiment. In these figures, reference numeral 17 denotes a pair of terminal blocks that are provided integrally with the sealing plate (not shown) by insert molding, and reference numeral 18 denotes threaded portions provided in the terminal blocks 17. These threaded portions 18 have their center axes provided in a direction intersecting at a slanting angle to the planar portion of the sealing plate. By constituting in this way, it becomes possible to screw-on and tighten from the upward slanting direction, when mounting the capacitor onto the circuit board. A new action and effect is achieved in which the degree of freedom in the mounting operation is increased.

The degree of freedom in mounting is further increased, by combining the threaded portion 15 of the fourth embodiment, in addition to the above-mentioned threaded portion 18. The threaded portion 15 has its center axis made to be parallel to the planar portion of the sealing plate.

(Sixth Embodiment)

The same reference numeral has been given and a detailed description has been omitted for members that are the same with the first embodiment, and only the portions that are different from the first embodiment are described in detail hereinafter, with references to the drawings.

Figure 8A:
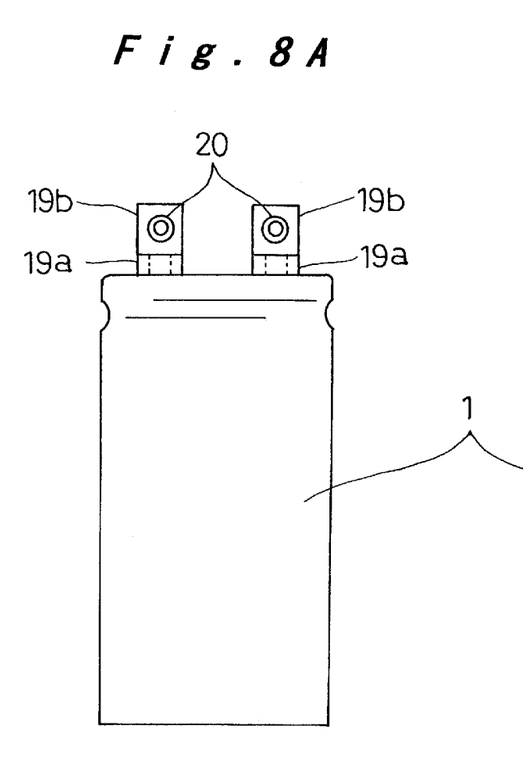
FIG. 8A is a front view showing the constitution of a capacitor according to a sixth embodiment of the invention.
Figure 8B:
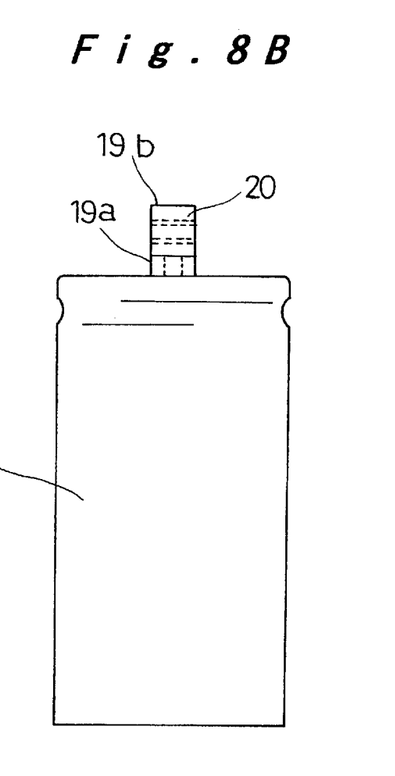
FIG. 8B is a side view of the same.

FIG. 8A is a front view and FIG. 8B is a side view, showing the constitution of a capacitor according to a sixth embodiment. In these figures, reference numerals 19a and 19b denote pairs of terminal blocks that are provided in the sealing plate (not shown). The terminal blocks 19a are provided integrally with the sealing plate by insert molding, and the terminal blocks 19b are unified to the terminal blocks 19a, by means such as screwing-together, joining, or the like. Reference numeral 20 denotes threaded portions provided in the terminal blocks 19b.

According to the above constitution, by preparing the sealing plate with the terminal blocks 19a provided integrally, it becomes possible to adapt to a situation in which the constitution of the threaded portion 20 is different, just by preparing the terminal blocks 19b afresh. Thus, it becomes possible to adapt to threaded portions of any type of construction with only one sealing plate.

In the capacitor of the present invention, the center axis of the threaded portion provided in the terminal block on the sealing plate is constituted to be parallel to the planar portion of the sealing plate. Hence, the center axis of the threaded portion is made to be vertical to the circuit board, when mounting the capacitor onto the circuit board. The series of operation from the insertion of the mounting screw to the tightening of the screw becomes very easy, and substantial improvement in workability and improvement in reliability are achieved at the same time.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A capacitor comprising:
   a capacitor element including leads for positive and negative electrodes;
   a metallic case having a cylindrical form with a bottom, the case accommodating said capacitor element along with an electrolyte solution; and
   a sealing plate that seals an opening of said metallic case, the sealing plate including a pair of terminal blocks having a connecting portion where said leads are connected, and include a threaded portion for outside connection, wherein a center axis of said threaded portion extends parallel to a planar portion of the sealing plate.

2. The capacitor according to claim 1, wherein
   the center axes of the pair of threaded portions intersect with a line mutually connecting both of central portions of the terminal blocks, in an angle not orthogonal; and
   both of the center axes are parallel to each other.

3. The capacitor according to claim 1, wherein
   the threaded portion is made to pierce through the terminal block.

4. The capacitor according to claim 1, wherein
   a sectional shape of the pair of terminal blocks is made to be either circular, circular with a straight line portion on one part, or square.

5. The capacitor according to claim 1, further comprising
   a threaded portion provided in the terminal block, the threaded portion having its center axis to be in a vertical direction relative to the planar portion of the sealing plate.

6. The capacitor according to claim 1, wherein
   the threaded portion is provided as a separate body from the terminal block.

7. A capacitor comprising:
   a capacitor element including leads for positive and negative electrodes;
   a metallic case having a cylindrical form with a bottom, the case accommodating said capacitor element along with an electrolyte solution; and
   a sealing plate that seals an opening of said metallic case, the sealing plate including a pair of terminal blocks having a connecting portion to which said leads are connected, and including a threaded portion for outside connection, wherein a center axis of said threaded portion extends parallel to a planar portion of the sealing plate;
   the center axes of the pair of threaded portions intersecting orthogonally to a line connecting central portions of both terminal blocks; and
   both of the center axes being parallel to each other.

8. A capacitor comprising:
   a capacitor element including leads for positive and negative electrodes;
   a metallic case having a cylindrical form with a bottom, the case accommodating said capacitor element along with an electrolyte solution; and
   a sealing plate that seals an opening of said metallic case, the sealing plate including a pair of terminal blocks having a connecting portion to which said lead are connected, and including a threaded portion for outside connection, wherein a center axis of said threaded portion extends parallel to a planar portion of the sealing plate and distances from a surface of the sealing plate to the center axes of both threaded portions are different from each other.

9. A capacitor comprising:
   a capacitor element including leads for positive and negative electrodes;
   a metallic case of cylindrical form with a bottom, the case for accommodating said capacitor element along with electrolyte solution; and
   a sealing plate for sealing an opening of said metallic case, the sealing plate including a pair of terminal blocks having a connecting portion where said lead is connected, and a threaded portion for outside connection, wherein
   a center axis of the threaded portion is provided in a direction intersecting at a slanting angle to a planar portion of the sealing plate.

* * * * *

UNITED STATES PATENT AND TRADEMARK OFFICE
CERTIFICATE OF CORRECTION

PATENT NO. : 6,590,761 B2
DATED : July 8, 2003
INVENTOR(S) : H. Miyazawa et al.

It is certified that error appears in the above-identified patent and that said Letters Patent is hereby corrected as shown below:

Column 6,
Line 43, "lead" should be -- leads --.

Signed and Sealed this

Twenty-fourth Day of February, 2004

JON W. DUDAS
*Acting Director of the United States Patent and Trademark Office*